United States Patent

[11] 3,597,107

[72] Inventors Gleb Stepanovich Schegolev
Sinyavinshkaya ulitsa, 12, kv. 29;
Semen Abromovich Granovsky,
Petrogeadskaya Storona, Bolshoi Prospekt,
17, kv. 13; Yan Frantsevich Bozhichka,
ulitsa Stankhanovtsev, 9b, kv. 27; Valdimir
Sergeevich Below, ulitsa S. Schedrina, 47,
kv. 2; Matveevna Dokumentova,
Bolsheokhtinsky prospekt, 79, kv. 46, all of
Leningrad, U.S.S.R.
[21] Appl. No. 798,711
[22] Filed Feb. 12, 1969
[45] Patented Aug. 3, 1971

[54] FEEDBACK APPARATUS FOR AN AUTOMATIC SPEED-GOVERNING SYSTEM OF A HYDRAULIC TURBINE
3 Claims, 4 Drawing Figs.

[52] U.S. Cl. .................................................. 416/31, 416/157
[51] Int. Cl. .................................................. F01d 7/02
[50] Field of Search ........................................ 416/31, 49, 50, 156, 157

[56] References Cited
UNITED STATES PATENTS
| 2,422,138 | 6/1947 | Seewer | 416/156 |
| 2,801,068 | 7/1957 | Deriaz | 416/157 |
| 3,229,771 | 1/1966 | Hedberg | 416/157 |
| 3,356,156 | 12/1967 | Reid | 416/157 |
| 3,404,738 | 10/1968 | Lindquist | 416/157 |

Primary Examiner—Everette A. Powell, Jr.
Attorney—Waters, Roditi, Schwartz & Nissen ABSTRACT: A feedback apparatus for an automatic speed-governing system of a hydraulic turbine comprises a driving means which includes a control drum external of said turbine and having a cam-shaped control surface. The control drum is operatively connected with the servomotor of the system and is adapted for being linearly displaced relative to the servomotor, yet to be jointly rotated with the servomotor. The driving means comprises an output link and a distributing valve connected to the output link and which is adapted to direct pressurized control fluid into corresponding spaces of the servomotor. The operative connection between the control drum and the servomotor provides for a limited displacement of the control drum axially of said turbine in the course of the joint rotation of the control drum with the servomotor. An abutment system is carried on the turbine and against which the control drum is permanently biased. Also included is a sleeve constituting an intermediary link adjacent the control drum. A bearing system is provided for supporting the sleeve on the control drum for relative rotation therebetween. The sleeve is disposed for reciprocating motion axially of the turbine.

Patented Aug. 3, 1971  3,597,107

FEEDBACK APPARATUS FOR AN AUTOMATIC SPEED-GOVERNING SYSTEM OF A HYDRAULIC TURBINE

The present invention relates to hydraulic turbines, and, more particularly, it relates to feedback apparatus for an automatic speed-governing system of a hydraulic turbine having feathering runner vanes pivotally adjustable by a rotary servomotor.

There are known arrangement for effecting feedback connection in the automatic speed-governing system of a hydraulic turbine, of the above-specified type, said known arrangements including a driving chain of which the main link is a control drum with a cam-shaped surface, and mounted on the servomotor. A rod running through the hollow runner shaft of the turbine has one end thereof engaging said control drum, while the other end of said rod is associated with the next successive link of said driving chain. The output link of this driving chain is connected to a valve distributing pressurized control fluid into the corresponding spaces of the servomotor. The control drum in these known arrangements is disposed either in a chamber defined by the upper portion of the servomotor, and the turbine shaft, or in the bottom space of the runner of the turbine (see, for example, British Pat. No. 753,237; application filed Nov. 13, 1953).

Practical operation of these known feedback arrangements for the automatic speed-governing systems of hydraulic turbines of the above-specified type presents, however, certain difficulties, particularly when the links of the driving chain of such feedback arrangement are to be inspected, adjusted or repaired, since these links are disposed inside the runner or inside the runner shaft of the turbine.

It is, therefore, the principle object of the present invention to overcome these difficulties by the creation of such feedback apparatus for an automatic speed-governing system of a hydraulic turbine, which combines comparatively simple structure with easy accessibility of the constituent members of the apparatus according to the invention for inspection, adjustment and repair purposes.

This object is attained in a feedback apparatus for an automatic speed-governing system of a hydraulic turbine heaving feathering runner vanes pivotally adjustable by a rotary servomotor, said apparatus comprising a driving chain of which the major link is formed by a control drum having a cam-shaped control surface, said control drum being mounted for joint rotation with said servomotor and being adapted to transmit linear displacement to the other links of said driving chain, the output link of said driving chain being drivingly connected with a distributing valve directing pressurized control fluid into the corresponding spaces of said servomotor and in which apparatus, in accordance with the present invention, said control drum is operatively connected with said servomotor, this connection providing for limited displacement of said control drum axially of said turbine as said servomotor is set into rotation, said control drum being permanently biased into engagement with abutments carried by a stationary portion of said turbine. One of the intermediate links of said driving chain, which is the next successive link to said control drum, is a sleeve mounted for relative rotation on said control drum with the help of bearing means, said sleeve being disposed for reciprocating motion axially of said turbine, the reciprocations of said sleeve being guided by guiding members associated with a stationary portion of said turbine.

It should be noted that this construction of the feedback apparatus provides for disposing the constituent members thereof outside the runner shaft of the turbine.

In a preferred embodiment of the present invention it is advisable that said control drum of the feedback apparatus be slidably, nonrotatively mounted by means of a key-and-slot connection on a tubular member adapted to conduct the pressurized control fluid to said servomotor said tubular member being connected to said servomotor.

This arrangement of the control drum simplifies the entire structure of the feedback apparatus.

It is also advisable that each one of said abutments engaged by said control drum should include a roller eccentrically mounted on a member angularly adjustable in a stationary part of said turbine. This feature facilitates adjustments of the initial positioning of the links of said driving chain.

Other objects and advantages of the present invention will be made apparent in the following detailed description of an embodiment thereof, due reference being had to the accompanying drawings, wherein.

Figure 1:
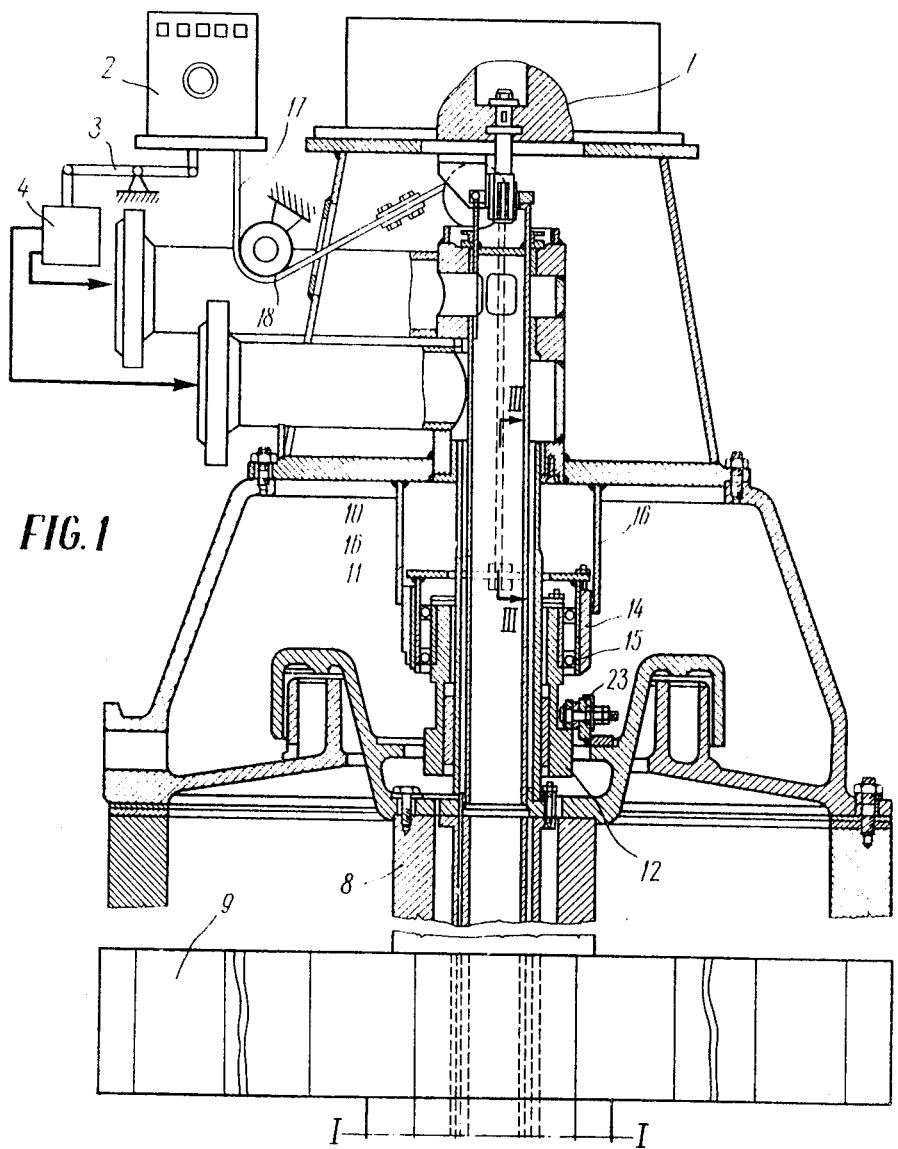
FIGS. 1 and 1a show schematically an axial sectional view of a hydraulic turbine with a rotary servomotor and the speed-governing system for this turbine respectively.
Figure 1A:
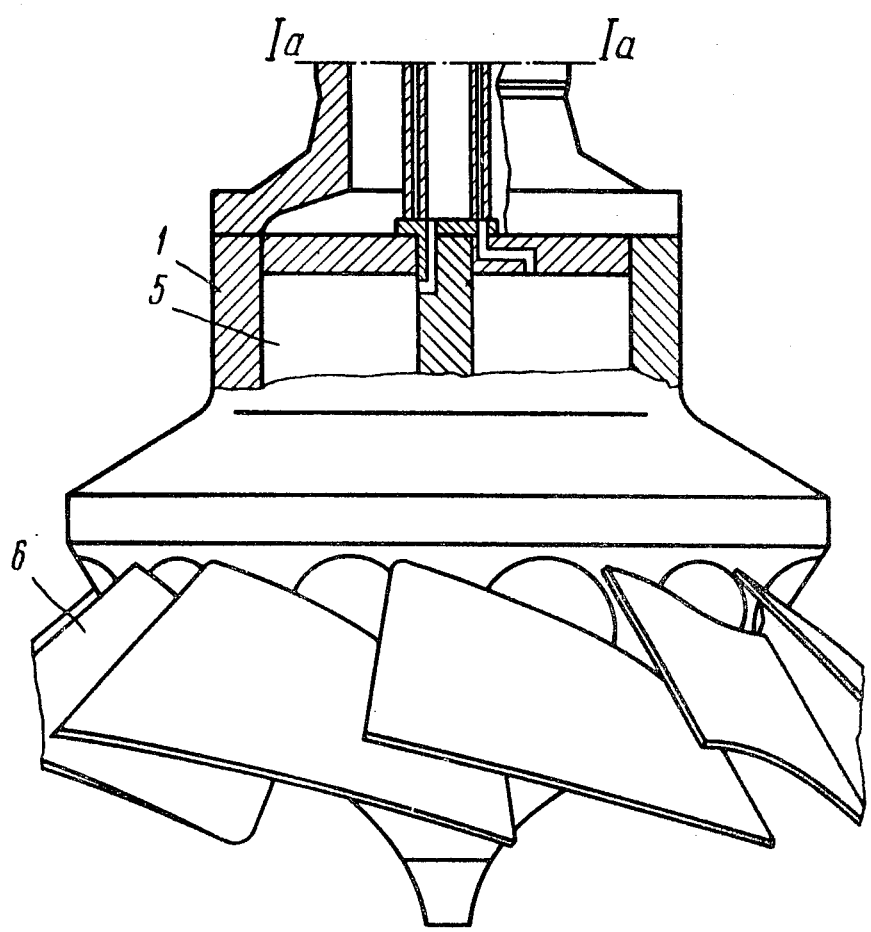

Referring now to the drawings, an automatic speed-governing system of a turbine 1 (FIG. 1a) comprises a speed governor 2 (FIG. 1) connected with a two-arm lever 3, through which it actuates a distributing valve 4 directing pressurized control fluid, e.g. oil under pressure into the respective spaces of a rotary servomotor 5 (FIG. 1a). The servomotor 5 controls the angular position of the feathering, or pivotally adjustable runner vanes 6 of the turbine. The rotational speed of the turbine 1 is measured by the frequency of alternating current produced by a specially provided pilot generator 7 connected with a shaft 8 of a main generator 9. Pressurized fluid is supplied to the internal spaces of the servomotor 5 via tubular conduits 10 and 11. Conduit 11 being disposed inside conduit 10. Both tubular conduits 10 and 11 are connected with the servomotor 5 for joint rotation therewith.

Mounted externally on the tubular conduit 10, coaxially therewith is a control drum 12 (FIG. 2) which acts as the main link of the feedback chain of the automatic speed-governing system of the turbine, performing its control functions by means of a key-and-slot connection 13.

Figure 3:
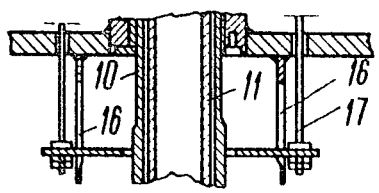
FIG. 3 is a sectional view taken of FIG. 1.

The next successive link in the feedback chain of the speed-governing system is a sleeve 14 rotatably mounted on the control drum 12, by means of ball bearings 15. Thus, the control drum 12 is able to rotate in relation to the sleeve 14. The latter is received between four guiding members 16 (FIG. 3) positively preventing rotation of the sleeve 14. The sleeve 14 has connected thereto a flexible slope 17 running about a sheave 18 (FIG. 1).

The rope 17 is permanently loaded, or tensioned by a control weight (not shown in the drawings) suspended therefrom. This tension of the rope 17 causes the sleeve 14 to permanently bias the control drum 12 upwardly, axially of the turbine. However, the upward displacement of the control drum 12 is restrained by three abutments 19 provided with rollers 20 which engage the cam-shaped annular shoulder surface 21 of the control drum 12. The rollers 20 are mounted eccentrically on pins 22 which are rotatively adjustable in brackets 23. When the links of the feedback chain of the speed-governing system herein described are to be adjusted, the pins 22 can be rotated relative to the brackets 23 to an adjusted position, in which they are retained by nuts 24.

Figure 2:
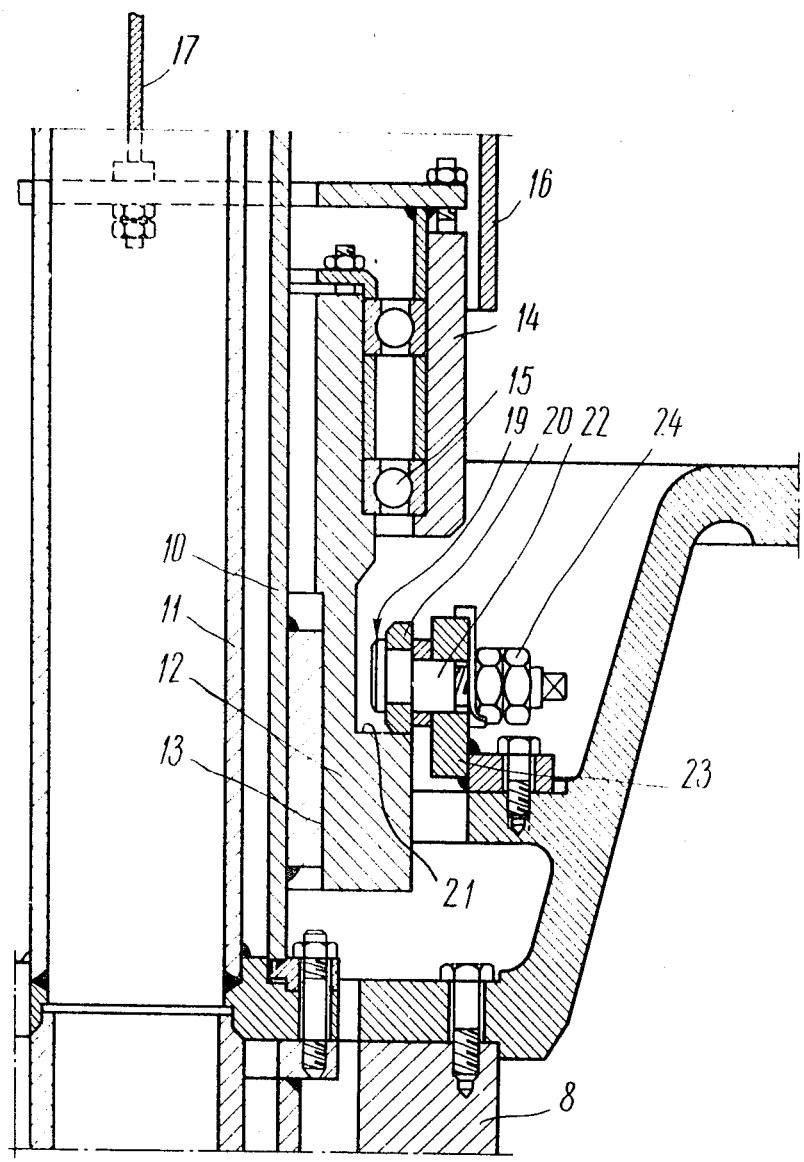
FIG. 2 is an enlarged sectional view of some of the details of the feedback apparatus for the speed-governing system, and also of a portion of the turbine.

When the speed governor 2 of the turbine is operated, pressurized control fluid is directed by the distributing valve 4 and effects corresponding rotation of the servomotor 5 (FIG. 1), together with the tubular conduit 10 (FIG. 2). The key-and-slot connection 13 between the tubular conduit 10 and the control drum 12 transmits rotation of the conduit to the drum. Owing to interaction of the annular cam-shaped shoulder surface 21 of the drum 12 with the rollers 20 (which are retained in their adjusted position axially of the turbine), the drum 12 is displaced along the axis of the turbine runner shaft by a distance which is proportional to the angle of rotation of the servomotor. This axial displacement of the control drum 12 is transmitted through the sleeve 14 to the flexible rope 17, of which the end opposite to that secured to the sleeve 14 is drivingly connected with the distribution valve 4 through the intermediary of the governor components (FIG. 1). In this manner feedback connection of the servomotor incorporated in the speed-governing system of the turbine is effected.

What we claim is:

1. Feedback apparatus for an automatic speed-governing system of a hydraulic turbine having runner vanes and pivotally adjustable by a rotary servomotor, said apparatus comprising driving means including a control drum external of said turbine and having a cam-shaped control surface, said control drum being operatively connected with said servomotor and mounted for joint rotation therewith and linear displacement relative thereto, said control drum being adapted for transmitting linear displacements thereof to other links of said driving means said driving means comprising an output link and a distributing valve connected to said output link and adapted to direct pressurized control fluid into the corresponding spaces of said servomotor, said operative connection between said control drum and said servomotor providing for limited displacement of said control drum axially of said turbine in the course of said joint rotation of said control drum and said servomotor, abutment means carried by a stationary part of said turbine and against which said control drum is permanently biased, said driving means further including a sleeve constituting an intermediate link adjacent to said control drum, bearing means supported said sleeve on said control drum for relative rotation therebetween, said sleeve being disposed for reciprocating motion axially of said turbine, and guiding means associated with a stationary portion of said turbine for guiding the reciprocation of said sleeve.

2. Feedback apparatus according to claim 1, including a tubular member and in which said control drum is slidably, nonrotatively connected by means of a key-and-slot connection to said tubular member, said tubular member being adapted to conduct said pressurized control fluid to said servomotor, said tubular member being connected with said servomotor.

3. Feedback apparatus according to claim 1, in which said abutment means engaged by said control drum includes at least one roller eccentrically mounted on an angularly adjustable member.